United States Patent
Letzer

[11] 3,758,207
[45] Sept. 11, 1973

[54] MASKING PRINTER

[75] Inventor: Edward K. Letzer, Rochester, N.Y.

[73] Assignee: Eastman Kodak Company, Rochester, N.Y.

[22] Filed: June 14, 1972

[21] Appl. No.: 262,854

Related U.S. Application Data

[63] Continuation of Ser. No. 81,960, Oct. 10, 1970, abandoned.

[52] U.S. Cl. .............. 355/80, 350/160 LC, 355/71
[51] Int. Cl. ............................................. G03b 27/76
[58] Field of Search ................ 350/160 LC; 355/80, 355/71

[56] References Cited
UNITED STATES PATENTS

3,680,956   8/1972   Custer................................ 355/80 X
3,610,732   10/1971  Mack ............................... 350/160 R

FOREIGN PATENTS OR APPLICATIONS

891,992   3/1962   Great Britain ........................ 355/71

Primary Examiner—Samuel S. Matthews
Assistant Examiner—M. D. Harris
Attorney—Gary D. Fields, W. H. J. Kline et al.

[57] ABSTRACT

A masking device is provided for reducing contrast of a projected slide transparency image which includes a photoconductive-liquid crystal layer which is exposed to the slide transparency image by a masking light to form a masking image thereon. Subsequently, a projection light is projected through the masking image formed on the sandwich structure and through the slide transparency to form a reduced contrast image on a photosensitive surface.

4 Claims, 2 Drawing Figures

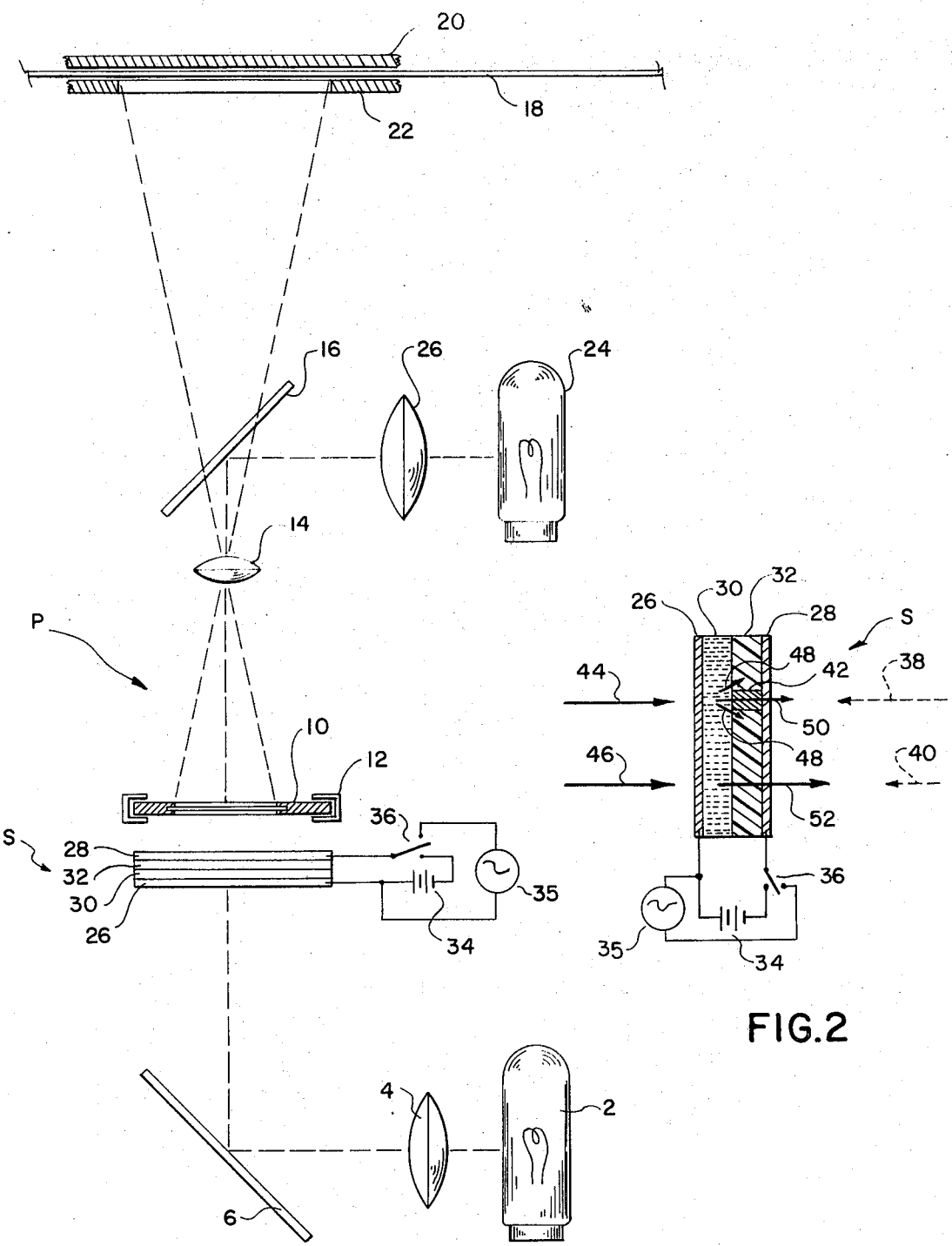

MASKING PRINTER

This application is a continuation of application Ser. No. 81,960, filed Oct. 10, 1970, now abandoned.

CROSS-REFERENCE TO RELATED APPLICATION

Reference is made to commonly assigned copending U.S. Application Ser. No. 81,959 entitled, "Method and Apparatus for Contrast Reducing" to John E. Morse, filed on Oct. 19, 1970.

BACKGROUND OF THE INVENTION

1. Field of the Invention

In accordance with this invention a masking apparatus and method is provided, and more particularly a masking structure for reducing contrast of an image projected from a slide transparency original.

2. Description of the Prior Art

Toward the end of the 19th century F. Reinitzer and O. Lehmann independently observed that certain substances in passing from a solid crystalline state to an isotropic liquid state pass through a state or condition over a given temperature range wherein they display rheological properties similar to that of fluids, but have optical properties similar to that of the cyrstalline state. In order to identify these properties, Lehmann used the term "liquid crystal", which terminology persists today. Present thinking tends to regard substances which exhibit these properties as being in a fourth state of matter inown as the mesomorphic state or mesophase since it is a state or phase intermediate that of the anisotropic crystal and that of the isotropic liquid.

There are three distinct mesomorphic states or forms, namely, the smectic mesophase, the nematic mesophase, and the cholesteric mesophase. A nematic liquid crystal is essentially transparent, and therefore transmits light, but when placed in a d.c. electric field the molecules of some of these liquid crystals become disoriented so that the material diffuses light and becomes milky white in appearance. When the d.c. electric field is removed, the molecules of the liquid crystal return to their previous orientation so that the liquid crystal is again transparent. This phenomena is discussed in PROCEEDINGS OF THE I.E.E.E., for July, 1968 in article entitled: "Dynamic Scattering: A new Electro-optical Effect in Certain Classes of Nematic Liquid Crystals", by Heilmeier, Zanoni and Barton at pages 1162-1171.

The reflective optical storage effect of mixtures of cholesteric and nematic liquid crystal materials is discussed in a paper appearing in APPLIED PHYSICS LETTERS for Aug. 15, 1968 in an article entitled, "A New Electric Field Controlled Reflective Optical Storage Effect in Mixed-Liquid Crystal Systems", By Heilmeier and Goldmacher at pages 132 and 133, in which the authors describe how a mixture of nematic and cholesteric mesomorphic materials serve as an optical storage under a d.c. or low frequency a.c. electric field, which changes the initially transparent material to a milky white light-diffusing material. The liquid crystal material remains in the light-diffusing state upon removal of the d.c. field. The mixture can be rapidly erased or changed back to a transparent state by the application of a high frequency a.c. signal greater than 700 Hz.

A serious problem which occurs when printing from slide transparencies onto photosensitive paper is that the resulting print has too high a contrast due to the relatively long exposure scale of the slide transparency. Thus, it is necessary to mask the projected image from the slide transparency to get a projected image of reduced contrast which is satisfactory for making prints. One method of accomplishing this is to laminate a strip of unexposed film to the ready mount which contains the slide transparency with double coated tape and expose it through the slide transparency. The filmstrip is then processed with surface application of a viscous developer to from a mask. Next, the laminated assembly is moved to a printing position where a printing light is supplied through the mask and projected by a printing lens onto photographic paper. The difficulties with such a system are readily apparent. It requires adequate means for attaching and removing the filmstrip from the ready mount and also severe registry problems may be encountered due to mask expansion during development. In addition, a viscous wet developer must be provided and means must be made for disposition of used and useless masks. Such a procedure is tedious and time consuming thereby increasing the cost of making prints from slide transparencies.

SUMMARY OF THE INVENTION

In accordance with this invention, masking is accomplished by means of a photoconductive-liquid crystal sandwich. This sandwich includes in order a first transparent electrode, a photoconductive layer, a liquid crystal layer and a second transparent electrode and also includes means for applying a d.c. potential between the first and second electrodes. This sandwich is placed in the projection path when projecting an image from the slide transparency onto a photosensitive surface and is positioned so that the first electrode faces toward the transparency. With a d.c. potential applied between the electrodes, when an image is projected onto the photoconductive surface, the exposed areas will become more conductive than the unexposed areas and will cause the corresponding areas of liquid crystal to diffuse light more than the corresponding areas to the unexposed portions of the photoconductive material. Conveniently the liquid crystal is a mixture of nematic and cholesteric materials which stores the image formed thereon when the d.c. potential is removed. Therefore, the resulting projected image on the photosensitive material will have less brightness in the exposed areas than does the original image thereby reducing the contrast.

More particularly, a masking device is provided wherein a photoconductive liquid crystal sandwich is exposed by a masking light image on the transparency to form a masking image on the liquid crystal layer. Subsequently, a projection light is projected through the sandwich structure whereby some of the light is diffused by the liquid crystal layer, particularly in the areas corresponding to the high illumination areas of the transparency. Thus, the projected transparency image onto a photosensitive surface will have less contrast than that of the original transparency image.

The image on the liquid crystal can be removed by application of an a.c. potential between the electrodes and the sandwich can be reused for the next transparency to be exposed. Thus, no registration problems are encountered nor does the mask have to be thrown away after use since it can be reused again and again.

Additional advantages of this invention will be readily apparent from the description which follows,

BRIEF DESCRIPTION OF THE DRAWINGS

FIG. 1 is a side elevation of a masking printer constructed in accordance with this invention, with parts in section, for clarity of illustration; and FIG. 2 is an enlarged section through the photoconductive-liquid crystal sandwich of FIG. 1.

DESCRIPTION OF THE PREFERRED EMBODIMENT

It is well known that liquid crystals, particularly those of the nematic type or a combination of nematic and cholesteric materials are normally transparent but can be made to diffuse light by applying a potential across them. In accordance with this invention by interposing a photoconductive liquid crystal sandwich in the projection path along which an image of a slide transparency is projected, the liquid crystal can be used to diffuse some of the light in highly illuminated areas so that a lesser amount of the light strikes the photosensitive material on which a print of the slide transparency image is to be made. Thus, the reduced contrast required for making a print from a transparency can be accomplished without the necessity of developing a mask and registering it with the transparency original, as by laminating.

In accordance with this invention masking printer P includes a source of illumination, such as lamp 2 which projects light through lenses 4 which is reflected by mirror 6 along a projection path through photoconductive-liquid crystal sandwich S, which will be described later in more detail, and through transparency 10 mounted in a support 12. The image is projected by means of objective lens 14 through a beam splitter 16 and onto a photosensitive material 18, such as photographic film which is positioned on a support 20 and covered by a mask 22 which defines sharp edges for the resulting print.

The masking image is provided on the liquid crystal layer of the sandwich S prior to projection of the transparency image onto the photosensitive surface by means of a masking lamp 24 which projects light through lens 26 to be reflected by beam splitter 16, through objective lens 14 and through transparency 10 to project the image thereof onto the photoconductive-liquid crystal sandwich S.

This sandwich comprises spaced transparent electrodes 26 and 28, which may be made of NESA glass and which have spaced between them a liquid crystal layer 30 and a photoconductive layer 32 in contiguous relationship as best seen in FIG. 2. A d.c. potential may be applied across the electrodes by means of d.c. potential source 34 or an a.c. potential can be applied thereacross by a.c. source 35, depending on the position of switch 36. Both the liquid crystal layer and the photoconductive layer are normally transparent and when photoconductive layer 32 is exposed to little or no light it is insulative so that the potential drop between electrodes 26 and 28 is substantially all across photoconductive layer 32 and very little potential drop exists across liquid crystal layer 30. However, upon exposure to light the photoconductive layer becomes more conductive so that a greater portion of the potential drop is across liquid crystal 30 causing it to diffuse light.

A suitable liquid crystal material is a mixture of a nematic mesophase, such as N-[p-Methoxybenzylibene]-p-Butylaniline and a cholesteric mesophase of cholesteryl oleyl carbonate, wherein the mixture is 10 parts by weight of nematic mesophase to one part cholesteric mesophase. The photo-conductive material is 4, 4' - diethylamino-2, 2' dimethyltri-phenol methane and a polycarbonate resin together with a pysylium dye prepared as in Example I of British Pat. No. 1,153,506 issued Sept. 29, 1969.

A suitable thickness for the liquid crystal layer is 12 microns and is 10 microns for the photoconductive layer. The two layers conveniently are separated by a layer of cellulose nitrate of one micron or less in thickness which layer is to inhibit adverse chemical reactions between the liquid crystal material and the photoconductive material.

To form a masking image on liquid crystal layer 30, switch 36 is positioned to apply d.c. potential from source 34 and masking light 24 is turned on to project the image from transparency 10 onto photoconductor 32. The masking light intensity is on the order of 1000 foot-candles. The lighter areas of the transparency project more light as indicated by dotted arrow 38 and the darker areas of the transparency transmit less light as indicated by the shorter dotted arrow 40. Thus, areas of photoconductor 32 such as area 42 which receives a significant amount of light will become conductive so that a higher potential drop exists across the portion of liquid crystal 30 causing it to become diffusing. Whereas other areas of the photoconductor which are struck by no light or little light such as indicated by dotted arrow 40 remains substantially insulative and do not change the light trans-mitting characteristics of the corresponding portions of the liquid crystal. Thus, the liquid crystal layer 30 has formed thereon a masking image which tends to diffuse light in the areas corresponding to the lighter portions of the slide transparency and tends to transmit light in the darker areas. When the masking light and the d.c. potential are turned off the image is retained on the liquid crystal due to the memory characteristics thereof. The time for forming the liquid crystal image can be controlled by controlling either the time masking lamp 24 is on or by controlling the length of a d.c. pulse from source 34. The latter has been found preferable, since a sharp pulse can be applied. A potential of 400 volts for 0.5 seconds is satisfactory. Next, projection light 2 is turned on to project the transparency image onto photosensitive material 18. The illumination of liquid crystal 30 is substantially uniform as indicated by long solid arrows 44 and 46. However, the light indicated by arrow 44 strikes liquid crystal 30 which diffuses part of the light as indicated by short arrows 48 and transmits a lesser amount of light as indicated by arrow 50 to the slide transparency. On the other hand, the light indicated by arrow 46 substantially all passes through liquid crystal 30 and the rest of the sandwich S and is indicated as arrow 52 which has substantially the same magnitude as light indicated by arrow 46. Thus, slide transparency 10 is more greatly illuminated in the darker areas and less illuminated in the lighter areas thereby reducing the contrast of the resulting image which is projected onto photosensitive material 18. The intensity and duration of exposure light 2 is determined by the characteristics of photosensitive material 18 which is being exposed. After photosensitive material 18 has been exposed, projection light 2 can be turned off and an a.c. potential from a.c. source 35 can be applied across liquid crystal layer 30 by moving switch 36 to the appropriate position so that the liquid crystal goes back to its quiescent or transparent state and is ready for use as a mask for a subsequent slide to be projected. An a.c. potential of 600 volts at a frequency of 1000 Hz. applied for 1 to 2 seconds is satisfactory.

From the foregoing, the advantages of this invention are readily apparent. A masking device has been provided for a masking printer wherein a masking image is formed on a photoconductive-liquid crystal sandwich structure by means of a masking light projected through a transparency image and then the projection light is projected through this masking image and through the transparency to form an image of reduced contrast on a photosensitive surface, such as photographic film.

The invention has been described in detail with reference to a preferred embodiment thereof, but it will be understood that variations and modifications can be effected within the spirit and scope of the invention.

I claim:

1. In an apparatus for projecting an original image onto a photosensitive material including a light source, means for supporting the original image in a projection plane, means for projecting light along a projection path to project the original image onto the photosensitive material, and means for supporting the photosensitive material in an image plane, an improvement for reducing contrast of the projected image on the photosensitive member, said improvement comprising:
   a layered masking means in said projection path including in order:
   a first transparent electrode adjacent said transparency supporting means;
   a photoconductive layer;
   a liquid crystal layer; and
   a second transparent electrode;
   means for applying a potential between said first and second electrodes; and
   means for projecting a masking light through said transparency onto said photoconductive layer to form a mask in said liquid crystal layer having light diffusing characteristics which vary in accordance with the amount of light which strikes corresponding portions of said photoconductive layer.

2. In an apparatus for projecting a transparency image onto a photosensitive material including a light source, means for supporting a transparency in a projection plane, means for projecting light along a projection path to project the transparency image onto the photosensitive material, and means for supporting the photosensitive material in an image plane, an improvement for reducing contrast of the projected image on the photosensitive member, said improvement comprising:
   a layered masking means in said projection path including in order:
   a first transparent electrode adjacent said transparency supporting means;
   a photoconductive layer positioned between said first electrode and the photosensitive material support means and in contiguous relationship to said first electrode;
   a liquid crystal layer in contiguous relation-ship to said photoconductive layer; and
   a second transparent electrode in contiguous relationship to said liquid crystal layer; means for applying a potential between said first and second electrodes; and
   means for projecting a masking light through said transparency onto said photoconductive layer to form a mask in said liquid crystal layer having light diffusing characteristics which vary in accordance with the amount of light which strikes corresponding portions of said photoconductive layer.

3. Apparatus for projecting a slide transparency image, having lighter and darker areas, onto a photosensitive surface at reduced contrast, said apparatus comprising:
   a mount for supporting the slide transparency in a projection plane;
   means for projecting the slide transparency image along a projection path onto the photosensitive surface;
   means for supporting the photosensitive surface at an image plane along said projection path;
   a layered photoconductive-liquid crystal sandwich having means for applying a potential thereacross so that the lighter areas selectively increase the conductivity of the photoconductive layer to cause corresponding areas of the liquid crystal to diffuse light to a greater extent than in those portions corresponding to the darker areas when exposed to a masking light so that the projected image formed on the photosensitive surface has less contrast than said slide transparency image; and
   means for projecting said masking light through said slide transparency onto said sandwich prior to projection of said slide transparency image.

4. A method of reducing the contrast of an image projected along a projection path, said method comprising the steps of:
   projecting a masking light through a transparency original, having an image with lighter and darker areas, to project the image onto a layered photoconductive-liquid crystal sandwich having means for applying a potential thereacross so that the lighter areas selectively increase the conductivity of the photoconductive layer to cause corresponding areas of the liquid crystal to diffuse light to a greater extent than in those portions corresponding to the darker areas; and
   projecting an image along said projection path using said photoconductive-liquid crystal sandwich as a mask to reduce the contrast of said projected image.

* * * * *